United States Patent [19]

Seitz

[11] Patent Number: 5,006,645
[45] Date of Patent: Apr. 9, 1991

[54] DYES OF THE 1-SULFO-5-(2'-AMINO OR 2'-SUBSTITUTED AMINO-4'-FLUORO-5-TRIAZIN-6'-YL-AMINOMETHYL)-NAPHTHYL-2-AZO SERIES

[75] Inventor: Karl Seitz, Oberwil, Switzerland

[73] Assignee: Ciba-Geigy Corporation, Ardsley, N.Y.

[21] Appl. No.: 407,671

[22] Filed: Sep. 14, 1989

Related U.S. Application Data

[63] Continuation of Ser. No. 147,094, Jan. 20, 1988, abandoned, which is a continuation of Ser. No. 40,691, Apr. 17, 1987, abandoned, which is a continuation of Ser. No. 868,369, May 27, 1986, abandoned, which is a continuation of Ser. No. 468,091, Feb. 22, 1983, abandoned, which is a continuation of Ser. No. 273,719, Jun. 15, 1981, abandoned, which is a continuation of Ser. No. 66,980, Aug. 16, 1979, abandoned, which is a continuation of Ser. No. 954,818, Oct. 26, 1978, abandoned.

[30] Foreign Application Priority Data

Oct. 31, 1977 [LU] Luxembourg .................. 78,420

[51] Int. Cl.$^5$ ............ C09B 62/085; C09B 62/09; D06P 1/382; D06P 3/66
[52] U.S. Cl. .................. 534/635; 534/617; 534/632; 534/637; 534/638
[58] Field of Search ........... 534/632, 633, 635, 637, 534/622, 617, 638

[56] References Cited

U.S. PATENT DOCUMENTS 3,304,297 2/1967 Wegmann et al. ............ 534/632 X
3,332,929 7/1967 Morris et al. .................... 534/622 X
3,627,749 12/1971 Ackermann et al. ............... 534/638
3,950,128 4/1976 Gregory ........................ 534/632 X
4,049,704 9/1977 Jager ............................. 534/632 X

FOREIGN PATENT DOCUMENTS 1188606 4/1970 Fed. Rep. of Germany ...... 534/632
872313 8/1958 United Kingdom .

OTHER PUBLICATIONS

Harms, "Organofluorine Chemicals and Their Industrial Application", Chapter 9, p. 202 (1979).
J. Amer. Chem. Soc., 81, 3769–3770 (1959), Ehrenfried Kober et al.
Organic Chemistry, R. T. Morrison et al.

Primary Examiner—Floyd D. Higel
Attorney, Agent, or Firm—George R. Dohmann; Edward McC. Roberts

[57] ABSTRACT

Dyes of the formula

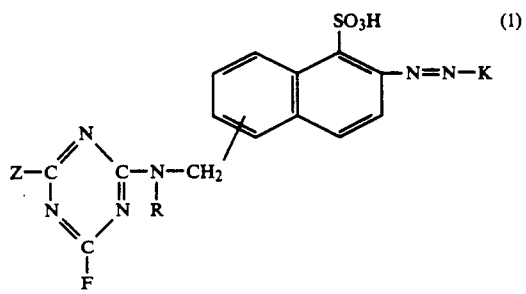

wherein K is the radical of a coupling component which can additionally contain azo groups, R is hydrogen or methyl, and Z is a fluorine atom, a substituted or unsubstituted amino group, a substituted or unsubstituted hydroxyl group, a substituted or unsubstituted mercapto group, or a substituted or unsubstituted hydrocarbon radical are distinguished by high reactivity and they produce dyeings of good wet- and light-fastness properties. The dyes of the Formula (I) are suitable for dyeing and printing a very wide variety of materials, such as silk, leather, wool, polyamide and polyurethane fibres, and especially cellulosic materials of fibrous structure, such as liner, cellulose, regenerated cellulose, and in particular cotton. They are suitable both for the exhaust method and for dyeing by the pad-dyeing process. They are also suitable for printing, in particular on cotton.

4 Claims, No Drawings

DYES OF THE 1-SULFO-5-(2'-AMINO OR 2'-SUBSTITUTED AMINO-4'-FLUORO-5-TRIAZIN-6'-YL-AMINOMETHYL)-NAPHTHYL-2-AZO SERIES

This application is a continuation of application Ser. No. 07/147,094, filed Jan. 20, 1988 abandoned, which is a continuation of Ser. No. 040,691, filed Apr. 17, 1987, abandoned, which is a continuation of Ser. No. 868,369, filed May 27, 1986, abandoned, which is a continuation of Ser. No. 468,091, filed Feb. 22, 1983, abandoned, which is a continuation of Ser. No. 273,719, filed June 15, 1981, abandoned, which is a continuation of Ser. No. 066,980, filed Aug. 16, 1979, abandoned, which is a continuation of Ser. No. 954,818, filed Oct. 26, 1978, abandoned.

The present invention relates to dyes of the formula

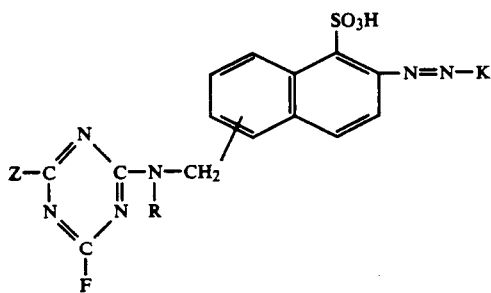

wherein K is the radical of a coupling component which can additionally contain azo groups, R is hydrogen or methyl, and Z is a fluorine atom, a substituted or unsubstituted amino group, a substituted or unsubstituted hydroxyl group, a substituted or unsubstituted mercapto group, or a substituted or unsubstituted hydrocarbon radical.

In the dyes of the formula (1), the radical of a coupling component K is the radical of a coupling component of the benzene or naphthalene series, of the heterocyclic series or the radical of a compound containing reactive methylene groups.

Preferably, the radical K contains water-solubilising groups, especially sulfonic acid groups.

Preferred dyes are those of the formula (1), wherein K is the radical of an acylaminonaphtholsulfonic acid, in particular the radical of a 1-acylamino-8-hydroxynaphthalene-3,6 or -4,6-disulfonic acid (acylamino-H- or -K-acid).

The substituent R is preferably a hydrogen atom.

If Z is a substituted amino, hydroxyl or mercapto group, possible substituents which are bonded to the triazine ring through the nitrogen, oxygen or sulfur atom are aliphatic, cycloaliphatic, aromatic and heterocyclic groups. If Z is a substituted amino group, the aminonitrogen atom, together with the substituents attached to it, can also form a cyclic radical, for example the morpholino radical. Eligible substituted hydrocarbon radicals Z are aliphatic, cycloaliphatic and aromatic radicals, which can be substituted for example by halogen, nitro, cyano, carboxyl, hydroxyl, alkoxy, aryl and the sulfo group.

As a substituted or unsubstituted amino group, Z can be for example: —NH₂, hydroxylamino, hydrazino, phenylhydrazino, sulfophenylhydrazino, methylamino, ethylamino, propylamino, isopropylamino, butylamino, β-methoxyethylamino, γ-methoxypropylamino, N,N-dimethylamino, N,N-diethylamino, N-methyl-N-phenylamino, N-ethyl-N-phenylamino, β-chloroethylamino, β-hydroxyethylamino, γ-hydroxypropylamino, β-sulfoethylamino, benzylamino, cyclohexylamino, morpholino, piperidino, piperazino, and especially aromatic amino groups, such as phenylamino, o-toluidino, N-methylanilino, N-ethylanilino, 4-carboxy-3-hydroxy-phenylamino, 2,5-dimethylanilino, 2-chloroanilino, p-anisidino, p-phenetidino, 2-, 3- and 4-sulfoanilino, 2,4-disulfoanilino, 2,5-disulfoanilino, sulfomethylanilino, N-sulfomethylanilino, 2-, 3- and 4-carboxyphenylamino, 2-carboxy-5-sulfophenylamino, 2-carboxy-4-sulfophenylamino, 2-methyl-4-sulfophenylamino, 2-methyl5-sulfo-phenylamino, 1,5-disulfonaphthyl(2)-amino, 4,8-disulfonaphthyl(2)-amino, 4,6,8-trisulfonaphthyl(2)-amino, 6-sulfonaphthyl(2)-amino, 4-sulfonaphthyl(1)-amino, 3,6-disulfonaphthyl(1)-amino, 3,6,8-trisulfonaphthyl(1)-amino and 3,6,8-trisulfonaphthyl(1)-amino. As a substituted or unsubstituted hydroxyl group, Z can be for example: hydroxy, methoxy, ethoxy, propyloxy, isopropyloxy, butyloxy, β-methoxyethoxy, β-ethoxyethoxy, γ-methoxypropoxy, γ-ethoxypropoxy, γ-propoxypropoxy, γ-isopropoxypropoxy, phenoxy, naphthoxy. As a substituted or unsubstituted mercapto group, Z can be for example: —SH, methylthio, ethylthio, propylthio, phenylthio and naphthylthio. As a substituted or unsubstituted hydrocarbon radical, Z can be for example: methyl, ethyl, propyl, isopropyl, butyl, isobutyl, sec-butyl, tert-butyl, n-hexyl, cyclohexyl, phenyl, α-naphthyl, β-naphthyl, chloromethyl, β-chloroethyl, β-hydroxyethyl, β-methoxyethyl, β-ethoxyethyl, β-isopropoxyethyl, benzyl, phenylethyl, 2-chlorophenyl, 2,5-dichlorophenyl, 3-bromophenyl, 4-nitrophenyl, 4-methylphenyl, 3-ethoxyphenyl, 2-trifluoromethyl-phenyl and 4-methylsulfonylphenyl.

All the aforementioned radicals Z can be further substituted, for example by alkyl groups of 1 to 4 carbon atoms, such as methyl, ethyl and propyl, alkoxy groups of 1 to 4 carbon atoms, such as methoxy, ethoxy, propyloxy and isopropyloxy, acylamino groups of 1 to 6 carbon atoms, such as acetylamino, propionylamino and benzoxylamino; amino groups, such as —NH₂, methylamino, ethylamino and N,N-dimethylamino; the ureido, hydroxyl, sulfo and carboxyl group; and halogen, such as fluorine, chlorine and bromine.

Preferred dyes are in particular those of the formula

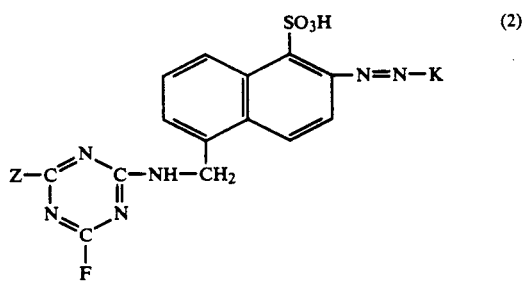

wherein Z is —NH₂, methylamino, ethylamino, sulfoethylamino, hydroxyethylamino, dihydroxyethylamino, cyclohexylamino, benzylamino, morpholino, N-methylphenylamino, N-ethylphenylamino, phenylamino which can be substituted by methyl, methoxy, ethoxy, chlorine, hydroxyl, carboxyl, acetylamino, ureido and sulfo, or naphthylamino which can be substituted by sulfo, and K is a substituted or unsubstituted naphthalene, pyridone or pyrazolone radical.

The radical of a coupling component K in formulae (1) and (2) can contain further substituents, for example: alkyl groups of 1 to 4 carbon atoms, such as methyl, ethyl and propyl; alkoxy groups of 1 to 4 carbon atoms, such as methoxy, ethoxy, propyloxy and isopropyloxy; acylamino groups of 1 to 6 carbon atoms, such as acetylamino, propionylamino and benzoylamino; amino groups, such as —NH₂, methylamino and ethylamino; the uriedo, hydroxyl and carboxyl group; halogen, such as fluorine, chlorine and bromine; and in particular the sulfo group.

In a preferred embodiment, K in formulae (1) and (2) is a 1-benzoylamino-8-hydroxy-3,6- or -4,6-disulfonaphthyl-(7) radical.

The radical of a coupling component K in formula (1) can itself contain azo groups. In this case, K is preferably the radical of a monoazo compound, for example the radical of azobenzene or azonaphthalene, which can be further substituted as indicated above.

Important dyes of the formulae (1) and (2), wherein K contains an azo group, are those in which K is a 1-amino-2-[mono- or disulfonaphthylazo]-8-hydroxy-3,6-disulfonaphthyl-(7) radical or a 1-amino-2-[sulfophenylazo]-8-hydroxy-3,6-disulfonaphthyl-(7) radical.

A particularly important subgroup of the dyes of the formula (1) consists of dyes of the formula

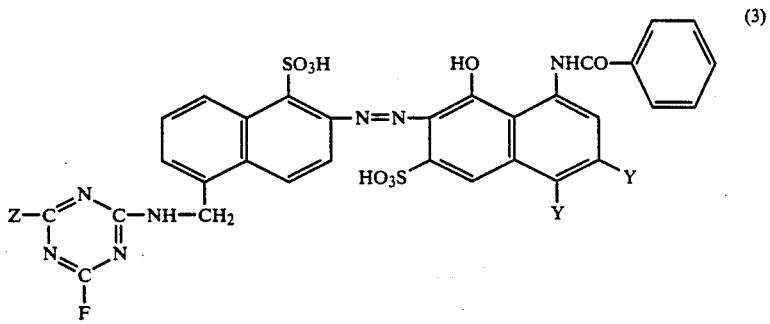

(3)

wherein Z is —NH₂, methylamino, sulfoethylamino, hydroxyethylamino, dihydroxyethylamino, cyclohexylamino, benzylamino, morpholino, N-methylphenylamino, N-ethylphenylamino, phenylamino which can be substituted by methyl, methoxy, ethoxy, chlorine, hydroxyl, carboxyl, acetylamino, ureido and sulfo, or naphthylamino which can be substituted by sulfo, and one Y is hydrogen and the other Y is sulfo.

Valuable dyes of the formula (3) are for example the dye of the formula

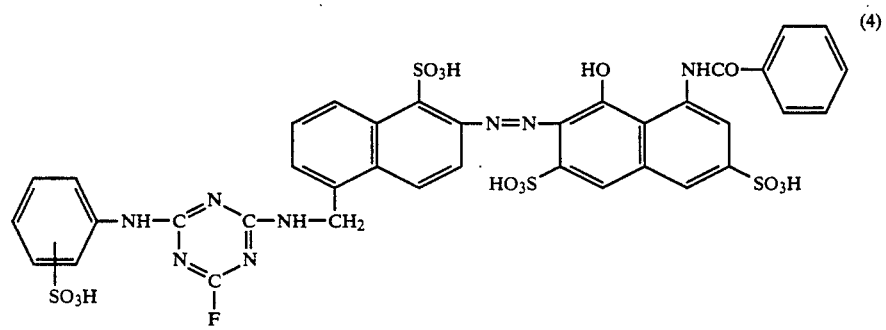

(4)

and the dye of the formula

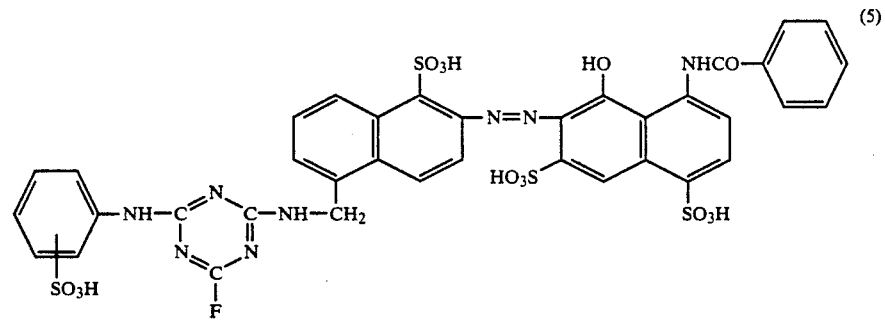

(5)

In the above formulae, the sulfo group in the phenylamino radical bonded to the s-triazine ring can be in the ortho-, meta— or para-position to the —NH bridge.

The radical of a coupling component K in formula (1) can also contain a fluoro-s-triazinylamino radical as substituent, preferably one identical to that which in the dyes of the formula (1) is bonded to the radical of the diazo component.

However, the analogous radicals Z and R in both fluoro-s-triazinylamino radicals can be independent of each other and thus different.

The dyes of the formula (1) are fibre-reactive, as they contain a removable fluorine atom in the s-triazine radical.

By fibre-reactive compounds are meant those which are able to react with the hydroxyl groups of cellulose or with the amino groups of natural or synthetic polyamides to form covalent chemical bonds.

The dyes of the formula (1) are obtained by reacting in any order, a diazotised amino compound of the formula

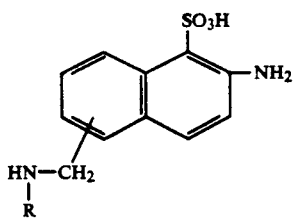 (6)

a coupling component of the formula

H—K (7)

a 2,4,6-trifluoro- or 2,4-difluoro-s-triazine of the formula

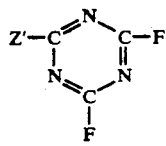 (8)

wherein Z' is a fluorine atom or a substituted or unsubstituted hydrocarbon radical, and a compound of the formula

Z—H (9)

wherein Z is as defined in formula (1), excepting a substituted or unsubstituted hydrocarbon radical, by coupling and condensation, to produce a dye of the formula (1).

In general, coupling components of the formula (7) are used, wherein K is the radical of the benzene or naphthalene series, of the heterocyclic series, or the radical of a compound containing reactive methylene groups, In particular, coupling components of the formula (7) are used, wherein the radical K contains water-solubilizing groups, in particular sulfonic acid groups.

A preferred embodiment of the process consists in using coupling components of the formula (7), wherein K is the radical of an acylaminonaphtholsulfonic acid, especially of a 1-acylamino-8-hydroxynaphthalene-3,6- or -4,6-disulfonic acid.

A further preferred embodiment of the process consists in using diazotised amino compounds of the formula (6), wherein R is a hydrogen atom.

The preferred dyes of the formula (2) are obtained by reacting, in any order, a diazotised amino compound of the formula

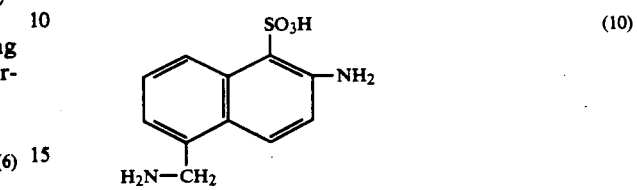 (10)

a coupling component of the formula (7), wherein K is as defined in formula (2), 2,4,6-trifluoro-s-triazine, and a compound of the formula (9), wherein Z is as defined in formula (2), by coupling and condensation, to produce a dye of the formula (2).

Preferably, 1-benzoylamino-8hydroxynaphthalene-3,6- or -4,6-disulfonic acid is used as coupling component of the formula (7).

A further preferred embodiment consists in using coupling components of the formula (7), wherein K is the radical of a monoazo compound. In particular, a 1-amino-2-[mono- or disulfonaphthylazo]-8-hydroxynaphthalene-3,6-disulfonic acid or a 1-amino-2-[sulfophenylazo]-8-hydroxynaphthalene-3,6-disulfonic acid is used as coupling component of the formula (7).

A further preferred embodiment consists in coupling a diazotised amino compound of the formula (10) to a coupling component of the formula

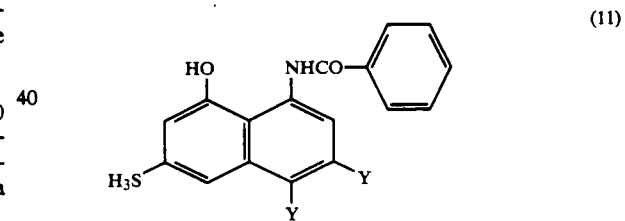 (11)

wherein one Y is hydrogen and the other Y is sulfo, condensing cyanuric fluoride with a compound of the formula (9), and condensing the resulting primary condensation product with the above monoazo intermediate to produce a dye of the formula

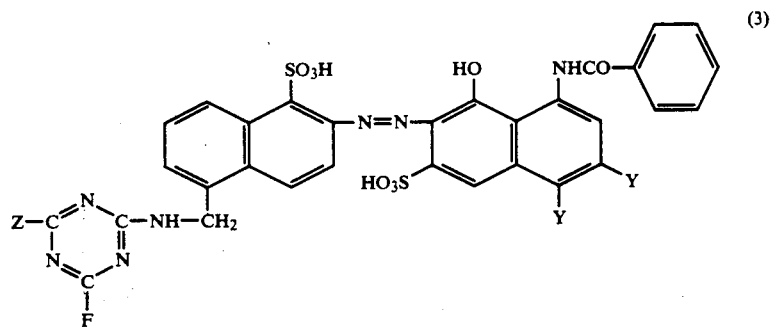 (3)

wherein Z is —NH$_2$, methylamino, sulfoethylamino, hydroxyethylamino, dihydroxyethylamino, cyclohexylamino, benzylamino, morpholino, N-methylphenylamino, N-ethylphenylamino, phenylamino which can be substituted by methyl, methoxy, ethoxy, chlorine, hydroxyl, carboxyl, acetylamino, ureido and sulfo, or naphthylamino which can be substituted by sulfo, and one Y is hydrogen and the other Y is sulfo.

The preferred dyes of the formulae (4) and (5) are obtained by coupling a diazotised amino compound of the formula (10) to 1-benzoylamino-8-hydroxynaphthalene-3,6-or -4,6-disulfonic acid and condensing the resulting monoazo dye with a 2,4-difluoro-6-sulfophenylamino-s-triazine prepared by condensation of cyanuric fluoride with an aniline-monosulfonic acid, or condensing the said monoazo dye with cyanuric fluoride and finally condensing the primary condensation product with an aniline-monosulfonic. acid.

As the individual process steps described above can be carried out in varying sequence, and, if desired, also in some cases simultaneously, different variants of the process are possible.

In general, the reaction is carried out stepwise in succession, and the sequence of the simple reactions between the individual reaction components of the formulae (6), (7), (8) and (9) can be freely chosen.

The possible variants of the process follow clearly from formula (1).

As starting materials which can be used for the production of the dyes of the formula (1) there may be mentioned:

Amino compounds of the formula (6)

2-amino-5-aminomethyl-naphthalene-1-sulfonic acid,
2-amino-5-N-methylaminomethyl-naphthalene-1-sulfonic acid,
2-amino-6-aminomethyl-naphthalene-1-sulfonic acid,
2-amino-6-N-methylaminomethyl-naphthalene-1-sulfonic acid.

Coupling Components of the formula (7)

phenol-4-sulfonic acid, β-naphthol, 2-naphthol-6- or -7-sulfonic acid, 2-naphthol-3,6- or -6,8-disulfonic acid, 1-naphthol-4-sulfonic acid,
1-phenyl-3-methyl-5-pyrazolone,
1-(4'-sulphophenyl)-3-methyl-5-pyrazolone,
1-(2',5'-di-chloro-4'-sulphophenyl)-3-methyl-5-pyrazolone, 3-aminocarbonyl-4-methyl-6-hydroxypyridone-2,
1-ethyl-3-cyano-or
-3-chloro-4-methyl-6-hydroxypyridone-2,
1-ethyl3-sulfomethyl-4-methyl-6-hydroxypyridone-2,
2,4,6-triamino3-cyanopyridine,
2-(3'-sulfophenylamino)-4,6-diamino-3cyanopyridine,
2-(2'-hydroxyethylamino)-3-cyano-4-methyl6-aminopyridine,
2,6-bis-(2'-hydroxyethylamino)-3-cyano4-methylpyridine, 2-benzoylamino-5-naphthol-7-sulfonic acid,
1-benzoylamino-8-naphthol-3,6- or 4,6-disulfonic acid, phenol, p-cresol, acetoacetanilide and
acetoacetic-2-methoxyaniline-5-sulfonic acid,
1-(4'-sulfophenyl)-pyrazolone-(5)-3-carboxylic acid,
3-methylpyrazolone-(5), 4-hydroxyquinolone-(2),
8-acetylamino-1-naphthol-3-sulfonic acid,
2-aminophthalene-5,7-disulfonic acid, 1-naphthol4,6- or -4,7-disulfonic acid, 1-amino-8-hydroxynaphthalene3,6- or -4,6-disulfonic acid.

The coupling component of the formula (7) can itself contain an azo group, in which case an azo compound is used as coupling component of the formula (7). This azo compound can be obtained in known manner from known components.

Particularly important dyes are those of the formula (1), wherein K is a radical of the formula

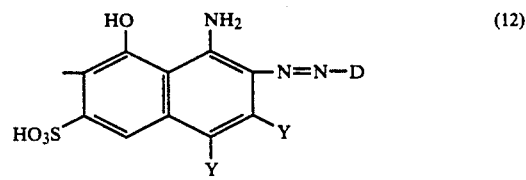

wherein one Y is hydrogen and the other Y is sulfo and D is the radical of a diazo component. They are obtained by "alkaline" coupling of a diazotised amino compound of the formula (6) and acid coupling of a diazotised diazo component of the formula $$H_2N-D \quad (13)$$

to 1-amino-8-hydroxynaphthalene-3,6- or -4,6-disulfonic acid, and the condensation with the trifluoro- or difluoro-3-triazine of the formula (8) is carried out in the above described manner.

As diazo components of the formula (13) there may be mentioned: aniline, o-, m- and p-toluidines, o-, m- and p-anisidines, o-, m- and p-chloroanilines, 2,5-dichloroaniline, α- and β-naphthylamine, 2,5-dimethylaniline, 5-nitro-2-aminoanisole, 4-aminodiphenyl, aniline-2-, -3- and -4-carboxylic acids, 2-aminodiphenyl ether, 2-, 3- or 4-aminobenzenesulfonamide or 2-, 3- or 4-aminobenzenesulfomonomethyl or -sulfoethylamide or 2-, 3- or 4-aminobenzenesulfodimethylamide or -sulfoethylamide, dehydrothio-p-toluidinemonosulfonic acid or dehydrothio-p-toluidinedisulfonic acid, aniline-2-, -3- and -4-sulfonic acids, aniline-2,5-disulfonic acid, 2,4-dimethylaniline-6-sulfonic acid, 3-aminobenzotrifluoride-4-sulfonic acid, 4-chloro-5-methylaniline-2-sulfonic acid, 5-chloro-4-methylaniline-2-sulfonic acid, 3-acetylaminoaniline-6sulfonic acid, 4-acetylaminoaniline-2-sulfonic acid, 4-chloroaniline-2-sulfonic acid, 3,4-dichloroaniline-6sulfonic acid, 4-methylaniline-2-sulfonic acid, 3-methyl-aniline-6-sulfonic acid, 2,4-dimethoxyaniline-6-sulfonic acid, 4-methoxyaniline-2-sulfonic acid and 5-methoxyaniline2-sulfonic acid, 2,5-dichloroaniline-4-sulfonic acid, 2-naphthylamine-4,8- and -6,8-disulfonic acid, 1-naphthyl-amine-2-, -4-, -5-, -6- or -7-monosulfonic acid, 1-naphthylamine-3,6-disulfonic acid, 2-naphthylamine-3,6and -5,7-disulfonic acid, 2-naphthylamine-3,6,8-trisulfonic acid, m- and p-nitroaniline, 4-nitroaniline-2-sulfonic acid, 3-nitroaniline-6-sulfonic acid, m- or p-aminoacetanilide and 4-amino-2-acetylaminotoluene-5sulfonic acid.

2,4,6-Trifluoro- or 2,4-difluoro-3-triazine of the formula (8)

2,4,6-trifluoro-3-triazine (cyanuric fluoride),
2,4-difluoro-6-methyl-s-triazine,
2,4-difluoro-6-ethyl-s-triazine,
2,4-difluoro-6-phenyl-s-triazine.

Compounds of the formula (9)

ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-,2,4-, 2,5-, 2,6-,3,4- and 3,5-dimethylaniline, o-, m- and p-chloroaniline, N-methylaniline, N-ethylaniline, 3- or 4acetylaminoaniline, o-, m- and p-nitroaniline, o-, m-and p-aminophenol, 2-methyl-4-nitro-aniline, 2-methyl-5nitroaniline, 2,5-dimethoxyaniline, 3-methyl-4-nitroaniline, 2-nitro-4-methyl-aniline, 3-nitro-4-methylaniline, o-, m- and p-phenylenediamine, 3-amino-4-methylaniline, 4-amino-3-methyl-aniline, 2-amino-4-methylaniline, o-, m- and p-anisidine, o-, m- and p-phenetidine, naphthylamine-(1), naphthylamine-(2), 1,4-diaminonaphthalene, 1,5-diamino-naphthalene, 2-amino-1-hydroxynaphthalene, 1-amino-4-hydroxy-naphthalene, 1-amino-8-hydroxy-naphthalene, 1-amino-2-hydroxy-naphthalene, 1-amino-7-hydroxy-naphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4sulfonic acid, 2-aminotoluene-5-sulfonic acid, p-aminosalicyclic acid, 1-amino-4-carboxybenzene-3sulfonic acid, 1-amino-2-carboxybenzene-5-sulfonic acid, 1-amino-5carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8 and -4,6,8- trisulfonic acid, 2-naphthylamino-1,3,7-, -1,5,7-, -3,5,7,-, -3,6,7-, -3,6,8- and -4,6,8-trisulfonic acid, 2-, 3- and 4-aminopyridine, 2-aminobenzthiazole, 5-, 6- and 8-aminoquinoline, 2-aminopyrimidine, morpholino, piperidine, piperazine, water, methanol, ethanol, propanol, isopropanol, n-butanol, isobutaneol, sec-butanol, terbutanol, hexanol, cyclohexanol, β-methoxyethanol, β-ethoxyethanol, γ-methoxypropanol, γ-ethoxypropanol , βethoxy-β-ethoxyethanol, glycolic acid, phenol, o-, m- and p-chlorophenol, o-, m- and p-nitrophenol, o-, m- and p-hydroxybenzoic acid, o-, m- and p-phenolsulfonic acid, phenol-2,4-disulfonic acid, α-naphthol, β-naphthol, 1-hydroxynaphthalene-8-sulfonic acid, 2-hydroxynaphthalene-1-sulfonic acid, 1-hydroxynaphthalene-5-sulfonic acid, 1-hydroxynaphthalene-4-sulfonic acid, 1-hydroxynaphthalene-6- or -7-sulfonic acid, 2-hydroxynaphthalene-6-, -7- or -8-sulfonic acid, 2-hydroxynaphthalene-4sulfonic acid, 2-hydroxynaphthalene-4,8- or -6,8-disulfonic acid, 1-hydroxynaphthalene-4,8-disulfonic acid, 2-hydroxynaphthalene-3,6-disulfonic acid, methanethiol, ethanethiol, propanethiol, isopropanethiol, n-butanethiol, thioglycolic acid, thiourea, thiophenol, α-thionaphthol, β-thionaphthol.

The diazotisation of the amino compounds of the formula (6) is usually effected by treatment with nitrous acid in an aqueous mineral acid solution at low temperature, and the coupling to the coupling components of the formula (7) is carried out at weakly acid or neutral to weakly alkaline pH values.

The condensation of the 2,4,6-trifluoro-1,3,5-triazine or 2,4-difluoro-1,3,5-triazine with the diazo components of the formula (6) and the compounds of the formula (9) are carried out preferably in aqueous solution or suspension, at low temperature and at a weakly acid or neutral to weakly alkaline pH value, and such that at least two removable fluorine atom remains in the azo dye of the formula (1). Advantageously, the hydrogen fluoride set free during the condensation is neutralised continuously by the addition of aqueous alkali hydroxides, carbonates or bicarbonates.

The dyes of the formula (1) are new. They are distinguished by high reactivity and they produce dyeings of good wet- and lightfastness properties.

The dyes of the formula (1) are suitable for dyeing and printing a very wide variety of materials, such as silk, leather, wool, polyamide and polyurethane fibres, and especially cellulosic materials of fibrous structure, such as linen, cellulose, regenerated cellulose, and in particular cotton. They are suitable both for the exhaust method and for dyeing by the pad-dyeing process, in which the goods are impregnated with aqueous and, if appropriate, also with salt-containing dye solutions, and the dyes are fixed after treatment with alkali or in the presence of alkali, with or without the application of heat.

They are also suitable for printing, in particular on cotton, and also for printing nitrogen-containing fibres, for example wool, silk or blends containing wool.

It is advisable to rinse the dyeings and prints thoroughly with cold and hot water, if appropriate with the addition of an agent which acts as a dispersant and promotes the diffusion of non-fixed dye.

In the following Examples, the parts and percentages are by weight.

EXAMPLE 1

A solution of 2 parts of cyanuric chloride in 5 parts of toluene is added dropwise in the course of 5 minutes to an ice-cold solution of 3.46 parts of orthanilic acid in 100 parts of water, while keeping the pH of the reaction mixture between 6 and 7 by the simultaneous addition of 1N sodium hydroxide solution. When the acylation is complete, the primary condensation product is poured into a neutral solution of 13.72 parts of the monoazo dye of the formula

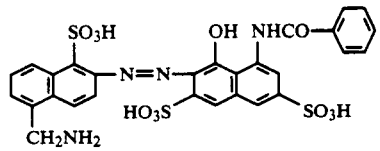

in 500 parts of water. The reaction mixture is warmed to 30°-35° C. and the pH is kept between 7 and 8 by the dropwise addition of 1N sodium hydroxide solution. When the acylation is complete, the dye is salted out by addition of 20% by volume of sodium chloride and collected by filtration. The dyestuff paste is mixed with a concentrated aqueous solution of 2 parts disodium hydrogen phosphate and dried in vacuo at 50° C. The resulting dye colours cotton in bluish red shades. Dyes which also dye cotton in bluish red shades are obtained by acylating the above monoazo dye according to the particulars of this Example with the aminodifluorotriazine compounds of the following amines:
aniline-2,5-disulfonic acid
aniline-2,4-disulfonic acid
anthranilic acid,
2-amino-toluene-5-sulfonic acid
2-amino-toluene-4-sulfonic acid
2-amino-naphthalene-1,5-disulfonic acid.

EXAMPLE 2

A solution of 2 parts of cyanuric chloride in 5 parts of toluene is added dropwise in the course of 5 minutes to an ice-cold neutral solution of 13.72 parts of the monoazo dye of the formula

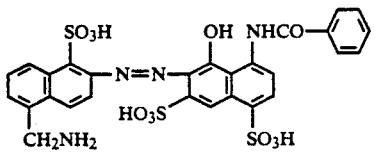

in 500 parts of water, while keeping the pH of the reaction mixture between 6 and 7 by the simultaneous addition of 1N sodium hydroxide solution. When the acylation is complete, a neutral solution of 3.46 parts of metanilic acid in 100 parts of water is added to the primary condensation product. The reaction mixture is warmed to 30°-35° C., while keeping the pH during the second condensation between 7 and 8 with 1N sodium hydroxide solution. The dye is salted out, collected by filtration, buffered with 2 parts of disodium hydrogen phosphate, and dried in vacuo at 50° C. It dyes cotton in red shades.

Similar dyes are obtained by reacting the difluorotriazine dye of this Example with one of the following amines instead of metanilic acid: sulfanilic acid, o-toluidine, ammonia, 2-naphthylamine-4,8-disulfonic acid, aniline, N-methylaniline, N-ethylaniline, taurine, 2-naphthylamine4,6-8-trisulfonic acid, 2-naphthylamine-6-sulfonic acid, 4-aminosalicylic acid, 2-chloroaniline, 2,5-dimethylaniline, 4-aminobenzoic acid, methylamine, ethanolamine, diethanolamine, cyclohexylamine, benzylamine, morpholine, m-toluidine, p-toluidine, 2,4-dimethylaniline, 2,6-dimethylaniline, m-chloroaniline, p-chloroaniline, o-anisidine, p-anisidine, acetyl-p-phenylenediamine, acetyl-m-phenylenediamine, 4-aminophenylurea, 3-aminophenylurea, 4-ethoxyaniline, 2-naphthylamine-8-sulfonic acid, aniline-2,5-disulfonic acid, 4-methylaniline-2-sulfonic acid.

EXAMPLE 3

A dye which colours cotton in green shades is obtained by acylating 17.92 parts of the disazo dye of the formula

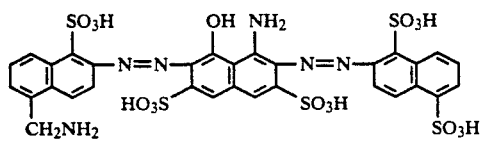

with 5.76 parts of the primary condensation product of orthanilic acid and cyanuric acid as described in Example 1.

EXAMPLE 4

A dye which colours cotton in bluish red shades is obtained by acylating both amino groups in 14.02 parts of the azo dye of the formula

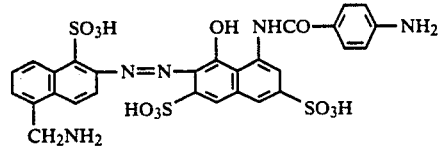

with 11.52 parts of the primary condensation product of orthanilic acid and cyanuric fluoride as described in Example 1.

EXAMPLE 5

A dye which colours cotton in greenish blue shades is obtained by acylating 15.32 parts of the disazo dye of the formula

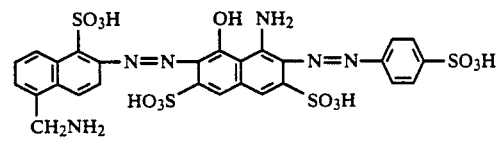

with 5.76 parts of the primary condensation product of orthanilic acid and cyanuric fluoride as described in Example 1.

EXAMPLE 6

A dye which colours cotton in yellow shades is obtained by acylating 10.2 parts of the monoazo dye of the formula

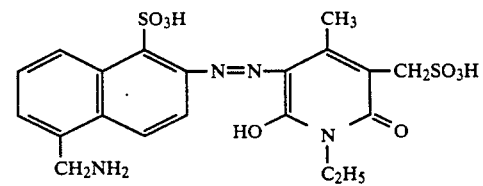

with 5.76 parts of the primary condensation product of orthanilic acid and cyanuric fluoride as described in Example 1.

EXAMPLE 7

A dye which colours cotton in yellow shades is obtained by acylating 10.94 parts of the monoazo dye of the formula

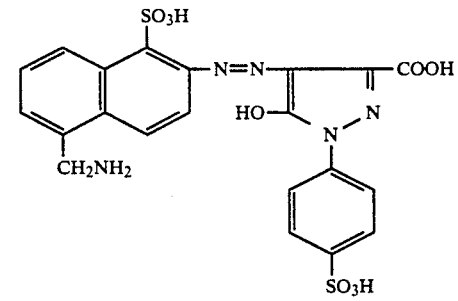

with 5.76 parts of the primary condensation product of orthanilic acid and cyanuric fluoride as described in Example 1. Further dyes which dye cotton in the shades indicated in column 3 of the following table are obtained by using 2-amino-5-aminomethyl-naphthalene-1-sulfonic acid as diazo component, the coupling components of column 1, cyanuric fluoride, and the amines listed in column 2.

| 1 | 2 | 3 |
|---|---|---|
| 1-hydroxy-8-acetylamino-naphthalene-3,6-disulfonic acid | o-toluidine | bluish red |
| 1-hydroxy-8-acetylamino-naphthalene-3,5-disulfonic acid | m-chloro-aniline | red |
| 1-hydroxy-naphthalene-3,6-disulfonic acid | aniline | yellowish red |
| 1-hydroxy-3-sulfo-6-benzoyl-amino-naphthalene | orthanilic acid | scarlet |
| 1-hydroxy-3-sulfo-7-(3'-sulfophenylamino)-naphthalene | metanilic acid | brown |
| 2-amino-8-hydroxy-naphthalene-6-sulfonic acid (acid coupled) | taurine | red |
| 1-(2'-chloro-5'-sulfophenyl)-3-methyl-pyrazolone-(5) | ethylamine | yellow |
| 1-(2',5'-dichloro-4'-sulfo-phenyl)-3-methyl-pyrazolone (5) | aniline-2,5-disulfonic acid | greenish yellow |
| 1-(4',8'-disulfonaphth-2'-yl)-3-methyl-pyrazolone-(5) | p-anisidine | yellow |
| 1-(4',8'-disulfonaphth-2'-yl)-3-carboxy-pyrazolone-(5) | ammonia | yellow |
| 1-ethyl-2-hydroxy-3-carb-amoyl-4-methyl-pyridone-(6) | sulfanilic acid | greenish yellow |

Dyeing Procedure 1

2 parts of the dye obtained according to Example 1 are dissolved in 100 parts of water while adding 0.5 part of sodium m-nitrobenzenesulfonate. A cotton fabric is impregnated with the resulting solution to a liquor pick-up of 75% and then dried. The fabric is then impregnated with a warm solution of 20° C. which contains, per litre, 5 g of sodium hydroxide and 300 g of sodium chloride, and squeezed out to a pick-up of 75%. The dyeing is steamed for 30 seconds at 100° to 101° C., rinsed, soaped for a quarter of an hour in a 0.3% boiling solution of a non-ionic detergent, rinsed and dried.

Dyeing Procedure 2

2 parts of the dye obtained according to Example 1 are dissolved in 100 parts of water. The solution is added to 1900 parts of cold water, 60 parts of sodium chloride are added and 100 parts of a cotton fabric are put into this dyebath. The temperature is raised to 40° C. and 40 parts of calcined sodium carbonate and another 60 parts of sodium chloride are added after 30 minutes. The temperature is kept for 30 minutes at 40° C. The dyeing is rinsed and then soaped for 15 minutes in a 0.3% boiling solution of a non-ionic detergent, rinsed and dried.

What is claimed is:

1. A dye of the formula

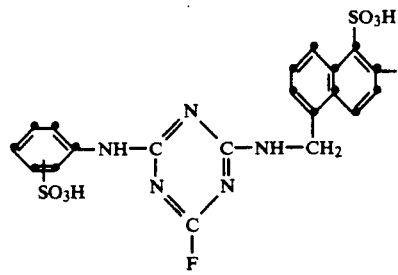
(4)

2. A dye of the formula

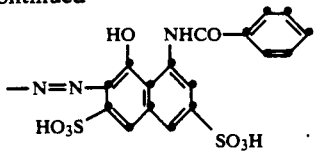

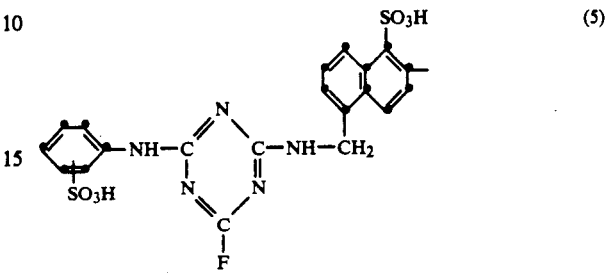
(5)

3. A dye of the formula

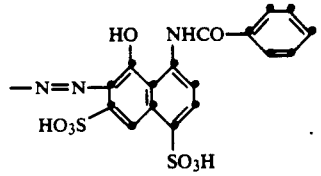

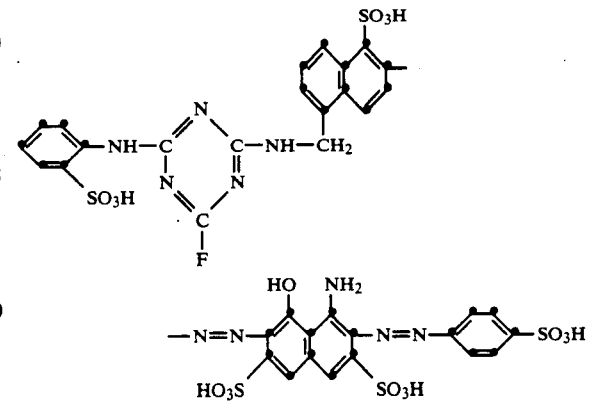

4. A dye of the formula

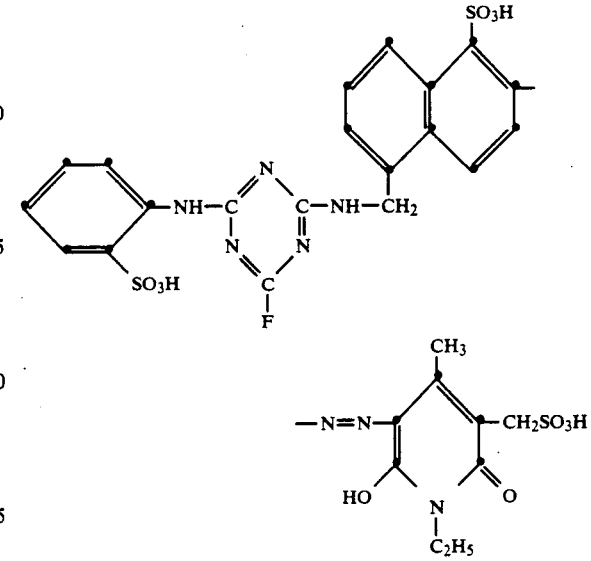

* * * * *